J. R. STOLL.
COMBINED CORN AND PUMPKIN-SEED PLANTER.
No. 174,023. Patented Feb. 22, 1876.
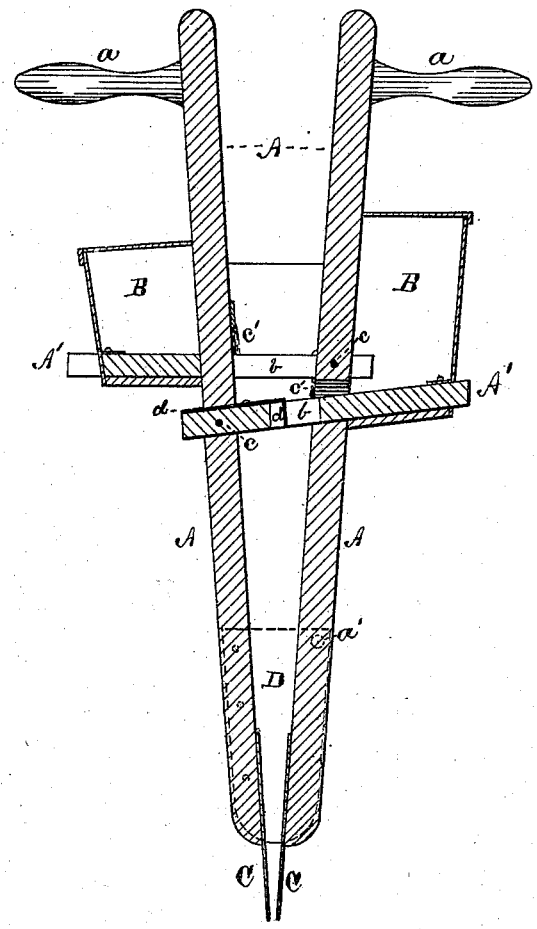

UNITED STATES PATENT OFFICE.

JACOB R. STOLL, OF NEWTON, NEW JERSEY.

IMPROVEMENT IN COMBINED CORN AND PUMPKIN-SEED PLANTERS.

Specification forming part of Letters Patent No. 174,023, dated February 22, 1876; application filed January 6, 1876.

*To all whom it may concern:*

Be it known that I, JACOB R. STOLL, of the village of Newton, in the county of Sussex and State of New Jersey, have invented certain new and useful Improvements in Corn and Pumpkin-Seed Planters Combined; and I do hereby declare that the following is a full, clear, and exact description thereof, which will enable others skilled in the art to which it appertains to make and use the same, reference being had to the accompanying drawings and to the letters of reference marked thereon, which form a part of this specification.

This invention relates to improvements in that class of seed-planters designed more especially to plant two kinds of seeds, as Indian corn, pumpkin-seed, and the like, and to be used and operated by hand, the object being to improve the construction of the implement.

The accompanying drawing fully illustrates the nature and character of my invention, being a vertical cross section of a seed-planter combining my improvements, which will be hereinafter more fully set forth and described.

The two sides A may be made of wood, and should be from two feet six inches to three feet in length, and provided with suitable handles $a$ and seed boxes or receptacles B, in which to deposit the seeds, substantially as shown and indicated in the drawing. A strip of thin sheet metal, C, is secured to the inside of each of the two sides at the bottom, and projects two or three inches below the end of the wood, the object of which will be duly set forth hereinafter. Metal plates D are also rigidly secured upon each edge of one of the sides, and extend from the bottom end several inches upward and across to the opposite side, said opposite side being pivoted between said plates at $a'$, as shown. The intervening space from the top of said plates D to the top, or nearly to the top, of the seed-chamber B is covered with enameled or india-rubber cloth or canvas, thus inclosing the space between the two sides, in order to prevent the seeds from falling out. The bottom of each seed-chamber is provided with a sliding plate or bar, $A'$, (fitting and sliding in a groove in said bottoms,) each of which is pivoted at one end, at $c$, to the side opposite the chamber in which it slides, all as shown and indicated in the drawing. In each of said slides $A'$ is an aperture or slot, $b$, through which the seeds pass, the capacity of which may be diminished or increased by means of an adjustable plate, $d$, in proportion to the number or quantity of seed which it is desired to have pass through them at one time.

In order to facilitate the operation of the slides and to prevent the seeds from clogging the apertures therein, I secure a bunch of bristles, $c'$, or a piece of felt or other flexible material, to each of the sides, so as to aid in sweeping or brushing the seeds away from said apertures as the slides are being moved back and forth in planting.

It will be seen that the slides $A'$ $A'$ instead of being one directly above the other, as heretofore, are arranged near opposite sides of the implement.

Prior to planting, the seed is placed in the receptacles B, (the corn in the larger and pumpkin-seed in the smaller one,) when the sides A are closed at the top and open at the bottom, in which position the apertures in the slides $A'$ are in position to receive the seeds, which are deposited therein automatically, as will be readily understood. The sides are then opened at the top, which, of course, closes them at the bottom, the two sheet-metal plates C coming in contact, and by their juxtaposition, forming a chamber or receptacle, in which the seed, by the latter operation, is deposited from the chambers above, the slides being thereby drawn out, carrying the seeds in their apertures with them, as clearly indicated in the drawing. The planter is then inserted into the earth the desired depth, and again closed at the top, and at the same time withdrawn from the earth, leaving the seed deposited therein, which, if it be mellow and properly prepared, will fall back and cover the seed without further effort on the part of the operator. The planter is then closed at the bottom and the operation repeated, as before.

As the slides are near the opposite sides of the implement the falling of the seed from one upon the other, where it would be retained, causing an unequal deposit, is prevented.

By the use of the broad plates D D the necessity of expensive hinged spouts is avoided, as ordinary screws $a'$ serve both as hinges and to connect the parts together, while simple flat plates $c\ c$ are substituted for the more costly devices hitherto employed.

I do not claim the combination of the two receptacles in a single hand-planter; nor the general construction of the implement; but

I claim—

The combination of the hinged sides A A, receptacles B B, and slides $A'\ A'$, arranged near opposite sides of the implement, as and for the purpose set forth.

In testimony that I claim the foregoing as my own, I hereto affix my signature in presence of two witnesses.

JACOB R. STOLL.

Witnesses:
 OLIVER DRAKE,
 J. C. TUNBRIDGE.